United States Patent Office 3,186,996
Patented June 1, 1965

3,186,996
PYRIDOXINE 3,4-DIACYLATES AND THEIR
PREPARATION
Kanjiro Kobayashi, Nishinomiya, and Haruyasu Ohta,
Tokyo, Japan, assignors to Nihon Surfactant Industries
Co. Ltd., Tokyo, Japan
No Drawing. Filed Apr. 19, 1962, Ser. No. 188,984
Claims priority, application Japan, Oct. 30, 1961,
36/38,736
11 Claims. (Cl. 260—295)

This invention relates to saturated or unsaturated fatty acid, 3,4-diacylates of pyridoxine and a process for producing them.

Higher acylates of pyridoxine were first reported by F. A. Kummerow and T. Sakuragi in Journal of the American Chemical Society, 1956, 839, and U.S. Patent 2,955,115, issued October 4, 1960. It is also reported by the same authors in the Journal of the American Oil Chemists' Society, 1956, 116; the Journal of Nutrition, 1956, 557, and Arch. Biochem. Biophys., 1956, 32, that such compounds have the fat-solubility, heat-stability and biological activity of vitamin $B_6$.

The present invention relates to pyridoxine 3,4-diacylates represented by the general formula

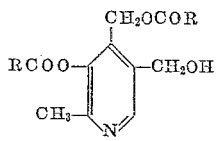

wherein R is a saturated or unsaturated fatty acid radical. The pyridoxine 3,4-diacylates according to the invention have higher values of fat-solubility and biological activity than pyridoxine triacylates formed of the same fatty acid. The present invention provides an inexpensive and simple method for producing pyridoxine 3,4-diacylates at high purity and yield.

In the synthesis of pyridoxine acylates, pyridoxine hydrochloride, which is a readily available raw material, is used as a starting material but it is not very soluble in the ordinary solvents adapted for carrying out the reaction. In the above mentioned literature, a large amount of a mixture of anhydrous chloroform and anhydrous pyridine is used to suspend the pyridoxine hydrochloride so as to enable it to react with a fatty acid chloride. However, in such method, it is difficult to synthesize a single ester by partially esterifying the three hydroxyl radicals present in the pyridoxine molecule. In synthesizing a single ester at a comparatively high yield, the only method heretofore suggested involves fully esterifying pyridoxine hydrochloride with an excess of a fatty acid chloride so as to make pyridoxine triacylates. Therefore, pyridoxine 3,4-diacylates having the general formula mentioned above are not yet known. The defects of the chloroform-pyridine suspension method are that it is very troublesome to separate and recover the pyridine after the reaction is completed and that, when the unreacted fatty acid is to be removed with an alkali from the solution containing the pyridoxine acylate product, a fatty acid alkali soap will be produced and the solution will be likely to become an emulsion and it will be difficult to separate the two liquids from each other. Especially, it will be difficult to carry out in a simple fashion and at a high yield the final purification of a pyridoxine acylate, which is a saturated or unsaturated liquid or a low melting point solid.

The present invention is intended to provide an improved synthesizing method which does not have the various synthesizing defects mentioned above and which also makes it possible to synthesize pyridoxine 3,4-diacylates specifically by esterifying only the two hydroxyl radicals in the 3,4-positions in the pyridoxine molecule.

The synthesizing method according to the present invention is substantially the Schotten-Baumann reaction wherein pyridoxine hydrochloride and a saturated or unsaturated fatty acid chloride are made to react with each other in the presence of a weakly basic acid-binding agent, such as pyridine, but is characterized in that the solvent used for the reaction is an N,N-disubstituted acid amide represented by the following formula

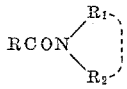

wherein R is a hydrogen atom or a lower alkyl radical and $R_1$ and $R_2$ are lower alkyl radicals or are morpholyl, piperidyl or pyrrolidyl radicals both together with N, or

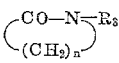

wherein $R_3$ is a lower alkyl radical and $n$ is the integer 3 or 4.

Solvents selected from the foregoing named group dissolve the pyridoxine hydrochloride in the presence of a weakly basic acid-binding agent, such as pyridine, especially well and are adapted to make pyridoxine hydrochloride, which is hardly soluble in general organic solvents, react uniformly in a perfectly dissolved state. The present invention is further characterized in that, when a saturated or unsaturated fatty acid chloride is reacted with pyridoxine hydrochloride in the presence of a solvent, such as the above mentioned N,N-disubstituted amides, and a weakly basic acid-binding agent, such as pyridine, only pyridoxine 3,4-diacylate will be precipitated directly, as a hydrochloride, at a high purity and yield. This facilitates the separation and purification of the resultant product. Furthermore, in the present invention, after the pyridoxine 3,4-diacylate is removed by filtration, the filtrate can be distilled under a reduced pressure to recover a mixture of the used solvent and the excess acid-binding agent in an anhydrous state at a high yield. Thus, the recovered distillate can be used again although additional acid-bonding agent may have to be added thereto. Thus, the present invention has the further advantage that it can be performed at lower cost.

The N,N-disubstituted amides having the above mentioned general formula and adapted to be used in the present invention include N,N-dimethylacetamide, N,N-dimethylformamide, morpholines, pyrrolidines or piperidines having such lower acyl radicals as butyryl, propionyl, acetyl or formyl at N and such cyclic lactams having a lower alkyl radical at N as, for example, N-methylpyrrolidone or N-methylpiperidone.

The weakly basic acid-binding agents which can be used in the present invention include heteroaromatic tertiary bases whose hydrochlorides are easily soluble in the above mentioned N,N-disubstituted acid amides such as, for example, pyridine and quinoline. Pyridine is especially satisfactory for the purposes of the present invention. When a weakly basic acid-binding agent, such as pyridine or quinoline, is present in the above mentioned N,N-disubstituted acid amide, the pyridoxine hydrochloride will dissolve therein comparatively well while the pyridoxine 3,4-diacylate hydrochloride will not be very soluble therein.

The fatty acid chlorides used in the present invention are chlorides of saturated or unsaturated fatty acids having a straight chain or a branched chain of from $C_4$ to $C_{18}$.

In the present invention, 1 mol of pyridoxine hydrochloride is added to an amount of the above mentioned N,N-disubstituted acid amide, which amount is from 15 to 40 times, preferably 20 to 30 times, by weight as large. 2.5 to 5 mols of a weakly basic acid-binding agent, such as pyridine, are added to the mixture. The mixture is then warmed and agitated so that the pyridoxine hydrochloride is dissolved as much as possible. Then 2 to 2.2 mols of a fatty acid chloride are gradually dropped into the mixture over a 30 to 60 minute period while the mixture is agitated and maintained at a temperature of from 40 to 60° C. After the fatty acid chloride is added, the agitation is continued for several hours, usually for 2 to 3 hours, at the same temperature and then the reaction is completed. Although the reaction can be carried out at room temperature, in order to dissolve the pyridoxine hydrochloride in the solvent as much as possible and to increase the reaction velocity, it is desirable to warm the mixture to a temperature as mentioned above. After the reaction mixture has cooler, the precipitated crystals consisting of pyridoxine 3,4-diacylate hydrochloride can be separated by filtration and the crystals can be washed with a proper solvent and dried. If the amount of the precipitated crystals is small, the reaction solution can be concentrated under a reduced pressure and left to stand to precipitate an additional amount of crystals.

According to the method of the present invention, the reaction mixture will be slightly colored during the reaction, but colorless crystals of the pyridoxine 3,4-diacylate hydrochloride high in purity will be obtained. These crystals contain no monoacylate or triacylate at all and give no coloration when subjected to a ferric chloride test. Their molecular structure is identical with that of pyridoxine 3,4-diacylate hydrochloride. When a saturated or unsaturated fatty acid of more than 8 carbon atoms is used, the yield of the pyridoxine 3,4-diacylate hydrochloride will reach 83 to 93 percent. When a lower number fatty acid is used, the resultant pyridoxine 3,4-diacylate hydrochloride is more soluble in the reaction solvent, and the yield will be somewhat less.

It is advantageous to carry out the reaction according to the method of the present invention in an anhydrous state as much as possible. Accordingly, in order to obtain the product at a high yield the raw materials and solvent used should be dried in advance. Further, the present invention provides a very advantageous industrial method because the mixture of the solvent and acid-binding agent, after the completion of the reaction, can be recovered at a high yield by distillation under a reduced pressure. The acid-binding agent in the distillate is quantitatively determined and is supplemented as necessary so that the distillate can be re-used.

The pyridoxine 3,4-diacylate hydrochlorides obtained by the present invention are all colorless, needle-shaped crystals and usually are of sufficient purity. Therefore, usually they need not be recrystallized. The free bases of the pyridoxine 3,4-diacylate hydrochlorides can be liberated by bringing them into contact with a base, such as an alkali hydroxide, an alkali carbonate, ammonia or an aliphatic amine, in a little excess of the calculated amount in water, together with a proper organic solvent or a mixed solvent. The free bases thus liberated will be at a high purity irrespective of whether they are crystalline or oily. Since pyridoxine 3,4-diacylate hydrochlorides can be isolated at a high purity, the free base thereof can be obtained at a high purity even though the free base is crystalline or oily. This is one of the advantages of the method of the present invention.

The pyridoxine 3,4-diacylate hydrochlorides and their free bases provided by the present invention will be subjected to hydrolysis and will present vitamin $B_6$ activity in a living body. However, compared with pyridoxine hydrochloride which is a normal form of vitamin $B_6$, pyridoxine 3,4-diacylate hydrochlorides have the useful property that the rate of excretion thereof from the body after administration is lower so that a higher level of vitamin $B_6$ activity is maintained in the body for a longer time. The pyridoxine triacylates formed of the same fatty acid also are not excreted from the body as fast as pyridoxine. However, the pyridoxine 3,4-diacylate hydrochlorides according to the invention are more advantageous than the corresponding triacylates because the appearance of the vitamin $B_6$ activity occurs more quickly after administration and at the same time the proportion occupied in the molecular weight by the pyridoxine moiety related with the biological activity is considerably larger. For example, whereas 100 g. of pyridoxine tripalmitate are equivalent to 23 g. of pyridoxine hydrochloride, 100 g. of pyridoxine 3,4-dipalmitate are equivalent to 32 g. of pyridoxine hydrochloride.

In view of the properties above mentioned, it will be evident that the pyridoxine 3,4-diacylate hydrochlorides are more useful than pyridoxine hydrochloride and pyridoxine triacylates as materials or medicaments for use in pharmaceutical preparations.

Pyridoxine hydrochloride is soluble in water but insoluble in fats and lipoids and, therefore, it is not useful for use in creams, ointment bases and the like for percutaneous administration. On the other hand, pyridoxine 3,4-diacylates are readily soluble in fats and lipoids and are more soluble in them than triacylates formed of the same fatty acid and are, therefore, applicable to skin treatment for percutaneous absorption by incorporation in creams, ointment bases and the like. Vitamin $B_6$ has important effects on the metabolism of epidermis and dermis so that the dermal physiological conditions can be improved by percutaneous administration. Therefore, pyridoxine 3,4-diacylates have excellent value as additives to local ointments and cosmetics used for the purpose of therapy of such dermatitises as acrodynia, acne and seborrheica and also for the beauty treatment of skins. Pyridoxine 3,4-dioleate and -dilinleate, which are unsaturated diacylates, have the greatest solubility in fats and lipoids and are, therefore, the most suitable. Also, the latter has vitamin F activity.

Not only pyridoxine 3,4-diacylates but also their hydrochlorides can be used for this purpose. If the hydrochlorides are used, they can be mixed together with such bases as alkanolamines to make local ointments, cosmetic creams or the like and they may be liberated as free bases at the time of formulation. Since pyridoxine 3,4-dilinoleate is an oily liquid at room temperature, if the hydrochloride thereof, which is of a crystalline form at room temperature, is used, the handling of same will be easier.

Further, saturated or unsaturated pyridoxine 3,4-diacylates having more than 12 carbon atoms in their acyl radicals are stable and, therefore, are useful also as additives for enriched fat base foods.

The present invention shall be further explained with reference to the following examples. It will be understood that these examples are given to illustrate the invention and not to limit it.

*Example 1*

5 g. of pyridoxine hydrochloride, 120 g. of N,N-dimethylformamide (anhydrous), and 7.7 g. of pyridine (anhydrous) were mixed together, agitated and warmed to form a solution. 14.5 g. of palmitoyl chloride were gradually added to the solution over a time period of 1 hour while the temperature of the solution was kept at 50 to 55° C., and a large amount of colorless crystals was precipitated. Thereafter, the solution was kept at the same temperature for 3 hours and was stirred. After cooling, the solution was left to stand overnight. Then the precipitated crystals were filtered, washed with a small amount of methanol and dried.

15.4 g. (93% of the theoretical amount) of colorless crystals of crude pyridoxine 3,4-dipalmitate hydrochloride of a melting point of 153 to 155° C. were obtained. When this product was recrystallized once from ethanol, colorless, needle-shaped crystals of a melting point of 154 to 155° C. were obtained. The analysis of $$C_{40}H_{71}O_5N \cdot HCl$$

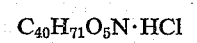

was calculated to be 70.40% C, 10.64% H and 2.05%

N and the analysis of the pyridoxine 3,4-dipalmitate hydrochloride product was found to be 70.21% C, 11.07% H and 2.17% N.

When the same experiment was carried out using dimethylacetamide instead of dimethylformamide the same product was obtained at substantially the same yield. In both cases, the filtrate of the reaction solution was distilled under a reduced pressure and the distillate was recovered for use in the next operation.

3.4 g. of the above mentioned crude pyridoxine 3,4-dipalmitate hydrochloride of a melting point of 153 to 155° C. were added to a solution of 40 cc. of methanol and 0.9 g. of triethanolamine and were heated and refluxed so that they completely dissolved. The solution was then left to cool. The precipitated crystals were filtered, washed with methanol, and dried. 3.2 g. of colorless crystals of pyridoxine 3,4-dipalmitate were obtained. The melting point was 88 to 89° C. The analysis of $C_{40}H_{71}O_5N$ was calculated to be of 74.37% C, 11.08% H and 2.17% N and the analysis of the pyridoxine 3,4-dipalmitate product was found to be of 74.10% C, 11.44% H and 2.27% N.

*Example 2*

14 g. of colorless crystals of crude pyridoxine 3,4-dipalmitate hydrochloride of a melting point of 153 to 155° C. (84.3% of the theoretical amount) were made by reacting 5 g. of pyridoxine hydrochloride, 175 g. of N-formylpiperidine (anhydrous), 7.5 g. of pyridine (anhydrous) and 14.5 g. of palmitoyl chloride by exactly the same operation as described in Example 1.

When exactly the same operation was carried out using same amount of N-formylpyrrolidine instead of N-formylpiperidine, a colorless crude pyridoxine 3,4-dipalmitate hydrochloride was obtained at a yield of 85%. In both cases when the filtrate of the reaction solution was concentrated under a reduced pressure and was left to stand, some additional amounts of crystals of the pyridoxine 3,4-dipalmitate hydrochloride were obtained.

Where N-formylmorpholine was used as the solvent, the reaction solution became yellowish and was a little more viscous than in the case of the other solvents and, therefore, a little more time was required to filter the crude pyridoxine 3,4-dipalmitate hydrochloride but the product was obtained at substantially the same yield.

*Example 3*

The same operation as described in Example 1 was carried out using N-methylpyrrolidone instead of N,N-dimethylformamide. Crude pyridoxine 3,4-dipalmitate hydrochloride was obtained at a yield of 83%. Even when N-methylpiperidone was used as the solvent instead of N-methylpyrrolidone, the crude pyridoxine 3,4-dipalmitate hydrochloride was obtained at the same yield.

*Example 4*

5 g. of pyridoxine hydrochloride, 120 g. of N,N-dimethylformamide (anhydrous), 7.7 g. of pyridine (anhydrous) and 11.3 g. of lauroyl chloride were made to react in accordance with the same procedure as described in Example 1. A first batch of colorless crystals of crude pyridoxine 3,4-dilaurate hydrochloride were obtained by filtering the reaction solution. The reaction solution was then concentrated under a reduced pressure and a second batch of crystals of the same material were obtained. A total of 11.9 g. of the crystals (89.5% of the theoretical amount) was obtained. The melting point of the crystals was 156 to 160° C. When the product was recrystallized once from ethanol, colorless needle-shaped crystals having a melting point of 159 to 160° C. were obtained. When this pure hydrochloride was recrystallized from methanol containing a little excess of the equivalent of triethanolamine, pyridoxine 3,4-dilaurate of a melting point of 79 to 80° C. was obtained.

*Example 5*

The reaction procedure was exactly the same as in the case of Example 1 and 5 g. of pyridoxine hydrochloride, 120 g. of N,N-dimethylformamide, 7.7 g. of pyridine and 8.4 g. of n-octanoyl chloride were reacted. After the reaction was completed, the reaction solution was concentrated under a reduced pressure to about half its original volume, cooled and left to stand. The deposited crystals were filtered, washed with a small amount of ethanol and dried. The filtrate was concentrated under a reduced pressure and a second batch of crystals were obtained. A total of 8.9 g. of colorless crude pyridoxine 3,4-di-n-octanoate hydrochloride (83% of the theoretical amount) was obtained. The melting point was 158 to 163° C. When it was recrystallized once from ethanol, a pure product of a melting point of 164 to 165° C. was obtained.

The above mentioned pure pyridoxine 3,4-di-n-octanoate hydrochloride was shaken together with an excess of a dilute aqueous solution of sodium carbonate and chloroform so as to be dissolved. The chloroform layer was separated, washed with water, and dried with sodium sulphate. When the crystalline residue obtained by distilling off the chloroform was once recrystallized with hexane, colorless pure pyridoxine 3,4-di-n-octanoate of a melting point of 69 to 71° C. was obtained.

*Example 6*

5 g. of pyridoxine hydrochloride, 120 g. of N,N-dimethylformamide, 7.7 g. of pyridine and 5.7 g. of n-butyryl chloride were made to react in the same fashion as described in Example 1. The reaction solution was concentrated under a reduced pressure to about one third its original volume, cooled and left to stand. Deposited colorless crystals were filtered, washed with a small amount of ethanol and dried. 4.7 g. (58% of the theoretical amount) of crude pyridoxine 3,4-di-n-butyrate hydrochloride was obtained. Its melting point was 168 to 170° C. When this was recrystallized once from ethanol, a pure pyridoxine 3,4-di-n-butyrate hydrochloride of a melting point of 169 to 171° C. was obtained.

When the above mentioned pure pyridoxine 3,4-di-n-butyrate hydrochloride was treated according to the method described in Example 5 to produce a free base and the crude pyridoxine 3,4-di-n-butyrate was recrystallized once from ligroin, a pure pyridoxine 3,4-di-n-butyrate of melting point of 57 to 58° C. was obtained.

*Example 7*

5 g. of pyridoxine hydrochloride, 120 g. of N,N-dimethylformamide, 7.5 g. of pyridine and 16 g. of oleoyl chloride were reacted in the same manner as described in Example 1 and 14.8 g. of colorless crude pyridoxine 3,4-dioleate hydrochloride (86% of the theoretical amount) of a melting point of 124 to 126° C. were obtained. When the product was recrystallized once from ethanol containing a small amount of dry hydrogen chloride, a pure pyridoxine 3,4-dioleate hydrochloride of a melting point of 126 to 127° C. was obtained.

When the above mentioned pure hydrochloride was liberated according to the method of producing a free base mentioned in Example 5 and the crude pyridoxine 3,4-dioleate thus formed was recrystallized from ethanol, a colorless pure pyridoxine 3,4-dioleate of melting point of 41 to 42° C. was obtained.

*Example 8*

When 4.4 g. of pyridoxine hydrochloride, 105 g. of N,N-dimethylformamide, 6.7 g. of pyridine and 14.0 g. of linoleoyl chloride were made to react in the same manner as described in Example 1. 12.5 g. of colorless crude pyridoxine 3,4-dilinoleate hydrochloride (86% of the theoretical amount) of a melting point of 110 to 113° C. were obtained. When the product was recrystallized once from ethanol containing a small amount of dry hydrogen chloride, a pure pyridoxine 3,4-dilinoleate hydrochloride of a melting point of 115 to 116° C. was obtained.

The above mentioned pure hydrochloride was liberated according to the method of producing a free base mentioned in Example 5. The obtained pyridoxine 3,4-dilinoleate was a practically colorless, transparent liquid at room temperature and crystallized in an ice chamber, but it was difficult to recrystallize.

Having thus described certain embodiments of the invention, what is claimed is:

1. A process for preparing pyridoxine 3,4-diacylate hydrochlorides in which pyridoxine hydrochloride is reacted with a member of the group consisting of saturated and unsaturated fatty acid chlorides in the presence of a weakly basic acid-binding agent and using as a solvent a member of the group consisting of an N,N-disubstituted amide represented by the formula

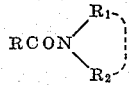

wherein R is a member of the group consisting of a hydrogen atom and a lower alkyl radical and $R_1$ and $R_2$ are members of the group consisting of lower alkyl radicals, morpholyl, piperidyl and pyrrolidyl radicals both together with N, and

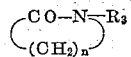

wherein $R_3$ is a lower alkyl radical and $n$ is the integer 3 or 4, so that a pyridoxine 3,4-diacylate hydrochloride is directly precipitated as crystals and the crystals are removed.

2. A process for preparing pyridoxine 3,4-diacylate hydrochlorides as described in claim 1, in which the solvent is a member of the group consisting of N,N-dimethylacetamide;
N,N-dimethylformamide;
N-formyl morpholine;
N-formyl pyrrolidine;
N-formyl piperidine;
N-methylpyrrolidone, and
N-methylpiperidone.

3. A process for preparing pyridoxine 3,4-diacylate hydrochlorides as described in claim 1 in which pyridine is used as the weakly basic acid-binding agent.

4. A process for preparing pyridoxine 3,4-diacylate hydrochlorides as described in claim 2 in which pyridine is used as the weakly basic acid-binding agent.

5. A process for preparing pyridoxine 3,4-diacylate hydrochlorides as described in claim 1 in which the fatty acid chloride has from 4 to 18 carbon atoms.

6. A process for preparing pyridoxine 3,4-diacylate hydrochlorides as described in claim 2 in which the fatty acid chloride has from 4 to 18 carbon atoms.

7. A process for preparing pyridoxine 3,4-diacylate hydrochlorides as described in claim 3 in which the fatty acid chloride has from 4 to 18 carbon atoms.

8. A process for preparing pyridoxine 3,4-diacylate hydrochlorides as described in claim 4 in which the fatty acid chloride has from 4 to 18 carbon atoms.

9. A process for preparing pyridoxine 3,4-diacylate hydrochlorides according to claim 1 in which the reaction is carried out by adding 1 mol of pyridoxine hydrochloride to a N,N-disubstituted acid amide, the weight of the N,N-disubstituted acid amide being 15 to 40 times the weight of the pyridoxine hydrochloride, then adding from 2.5 to 5 mols of the weakly basic acid-binding agent to the mixture, then warming and agitating the mixture so that the pyridoxine hydrochloride is dissolved, then adding gradually from 2 to 2.2 mols of the fatty acid chloride to the mixture while the mixture is maintained at a temperature of from 40 to 60° C. and is agitated, the agitation being further continued while maintaining the mixture at said temperature until the reaction is completed and a pyridoxine 3,4-diacylate hydrochloride is directly precipitated as crystals from the reaction solution.

10. A process as described in claim 9, in which the reaction solution is concentrated under a reduced pressure and is left to stand in order to obtain a further amount of crystals.

11. A process for preparing pyridoxine 3,4-diacylates as described in claim 1 in which said pyridoxine 3,4-diacylate hydrochloride is further treated with a base so that the free base thereof is liberated.

References Cited by the Examiner

UNITED STATES PATENTS

| | | | |
|---|---|---|---|
| 2,399,959 | 5/49 | Tucker | 260—410.9 |
| 2,897,203 | 7/59 | Carrara et al. | 260—295 |
| 2,955,115 | 10/60 | Kummerow et al. | 260—295 |

OTHER REFERENCES

Noller: "Chemistry of Organic Compounds," 2nd ed., p. 245 (Saunders) (1947).

Noller: "Chemistry of Organic Compounds," 2nd edition, pages 161, 549 (Saunders) (1957).

WALTER A. MODANCE, *Primary Examiner.*

IRVIN MARCUS, N. S. RIZZO, *Examiners.*